Oct. 11, 1932.  N. EMMONS, 3D  1,882,127
CULINARY APPARATUS
Filed Dec. 31, 1930    5 Sheets-Sheet 1
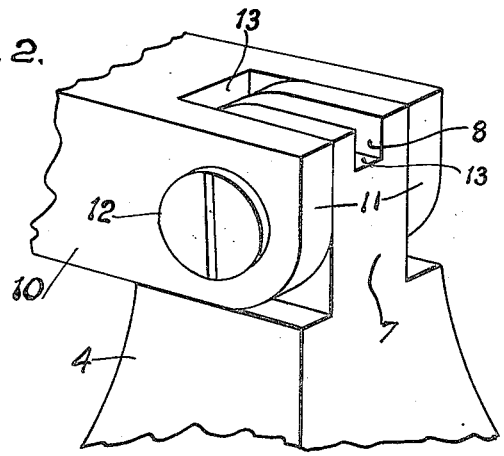
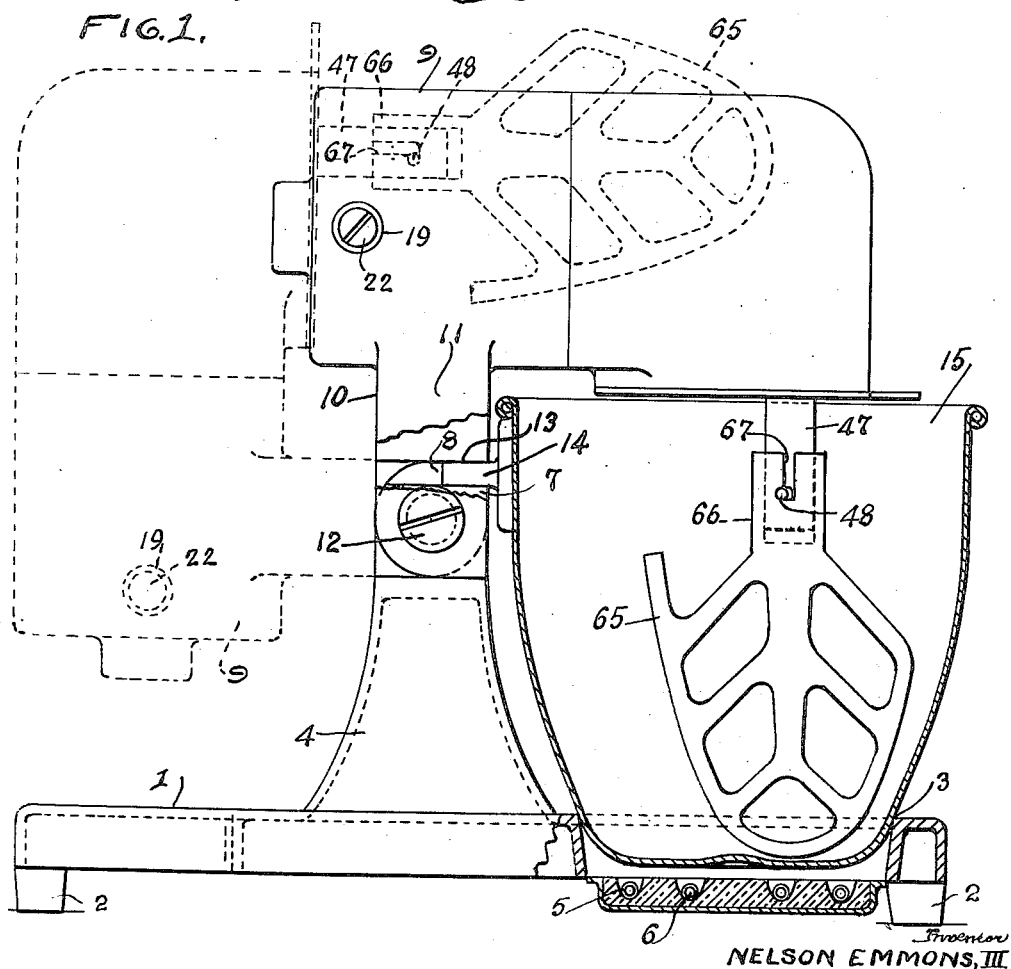
NELSON EMMONS, III

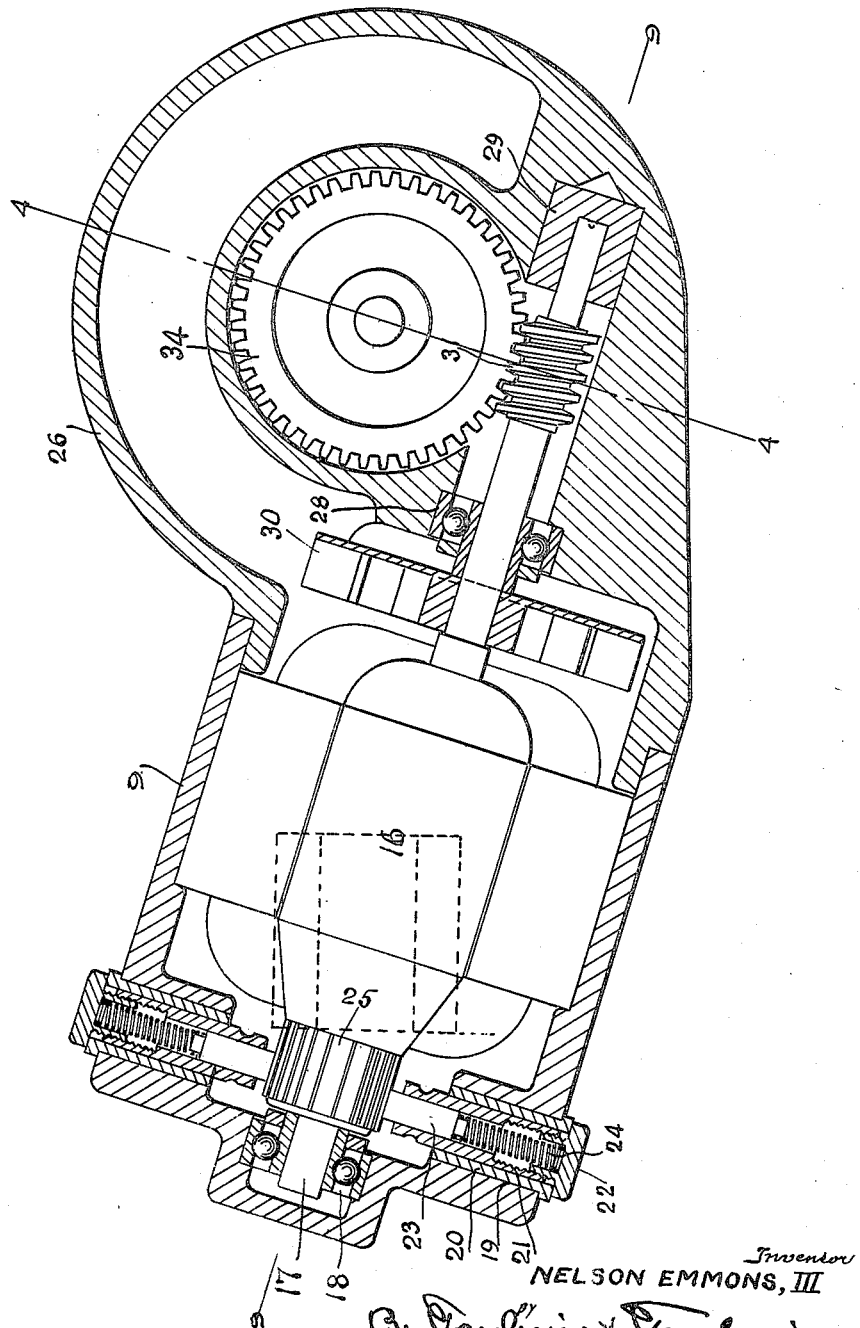

Oct. 11, 1932.    N. EMMONS, 3D    1,882,127
CULINARY APPARATUS
Filed Dec. 31, 1930    5 Sheets-Sheet 3
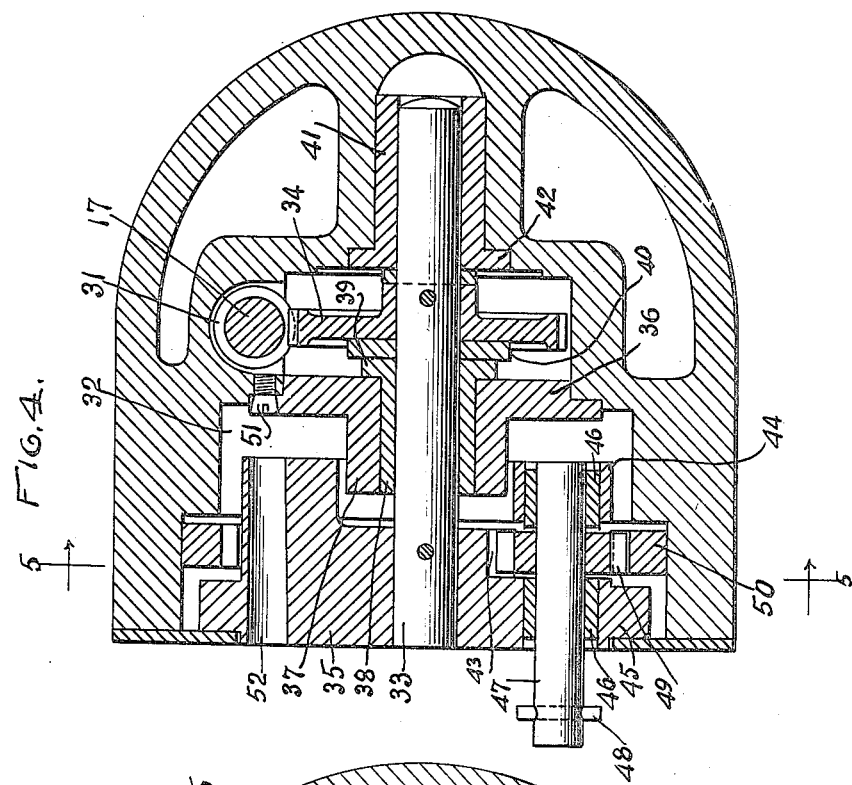
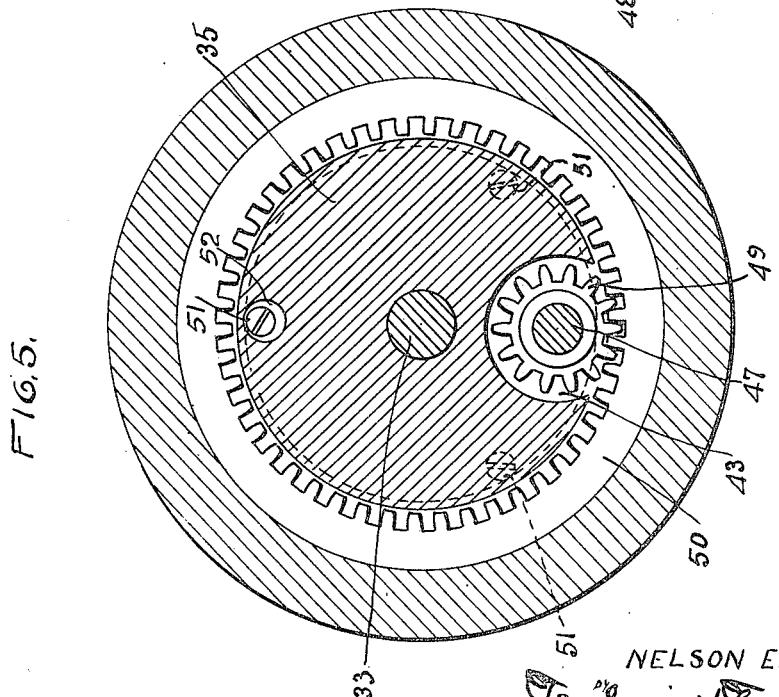
Inventor
NELSON EMMONS III.
Attorneys

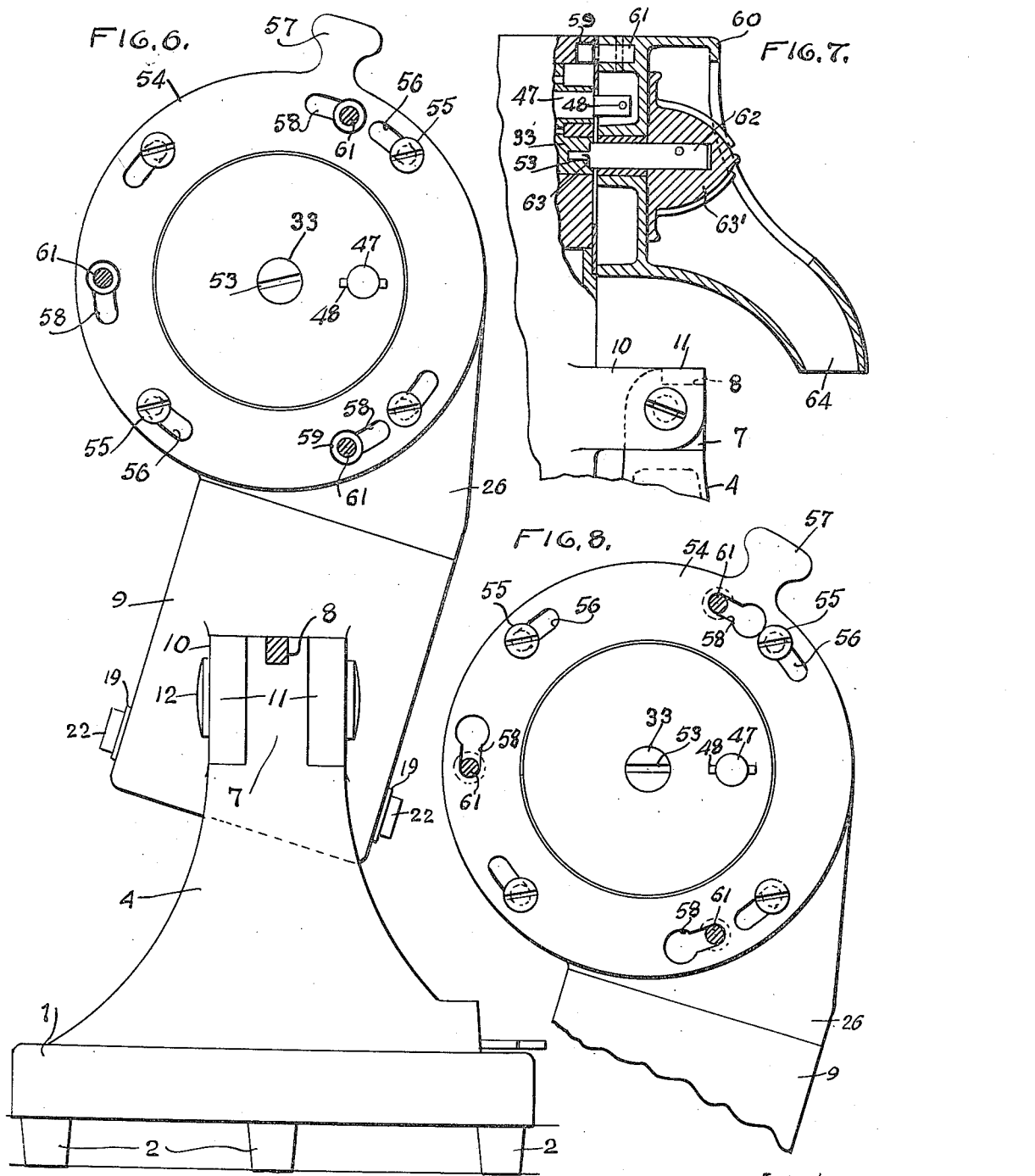

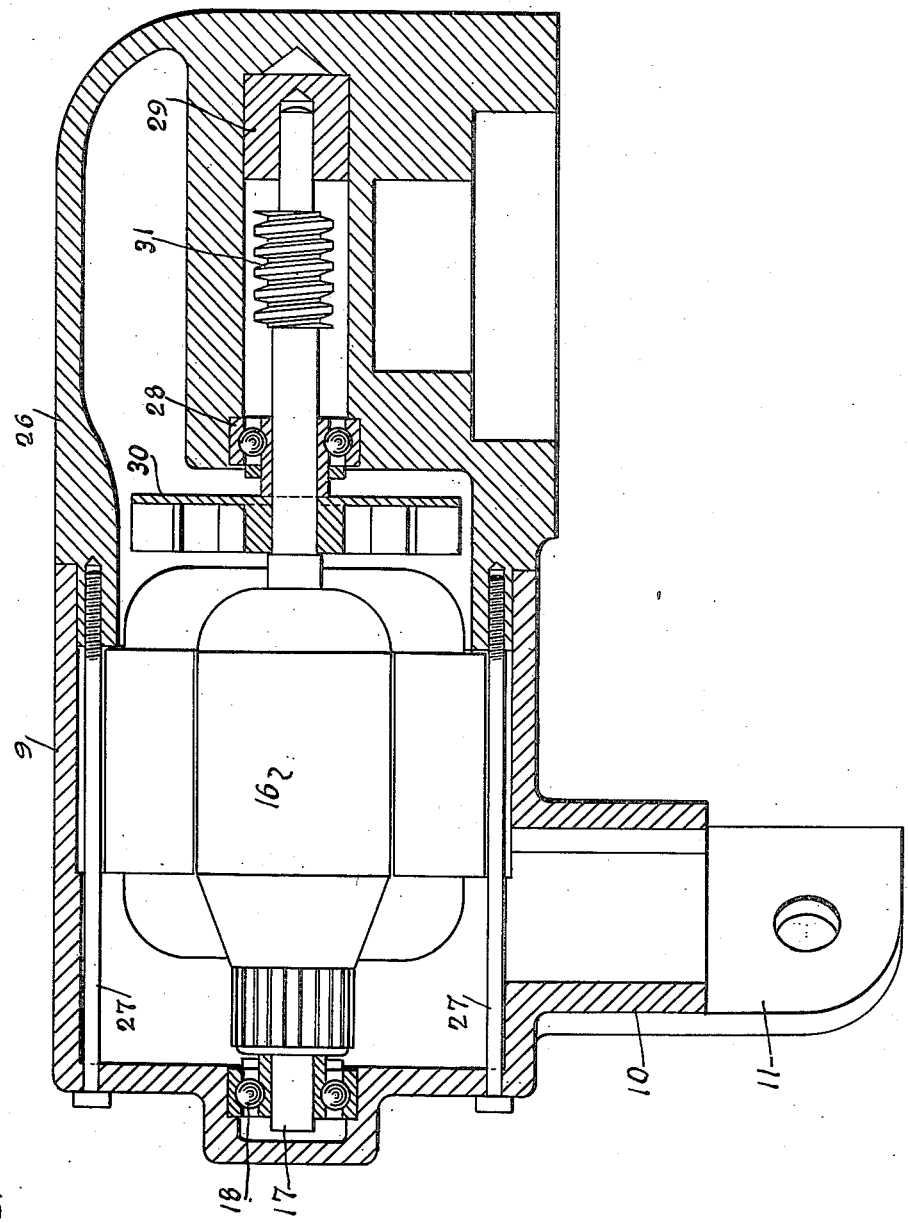

Patented Oct. 11, 1932

1,882,127

UNITED STATES PATENT OFFICE

NELSON EMMONS, 3D, OF DAYTON, OHIO, ASSIGNOR, BY MESNE ASSIGNMENTS, TO NELSON EMMONS, JR., AND JOSEPH W. GREEN, BOTH OF DAYTON, OHIO

CULINARY APPARATUS

Application filed December 31, 1930. Serial No. 505,829.

This invention relates to improvements in culinary apparatus for mixing and beating.

The apparatus is composed of a base or standard which supports thereon a tiltable head, the head carrying an operating mechanism that operates a stirrer for stirring the contents of a bowl supported by the base and the standard.

It is particularly the object of this invention to provide, in connection with a culinary apparatus having a tiltable head, gripping means operated by the parts constituting the tiltable structure of the head for holding a bowl supported on a base.

It is the further object of this invention to provide a tiltable head composed of two sections, one containing a motor and the other containing a rotating mechanism connected so that one may be easily separated from the other.

It is also the object of this invention to provide in connection with a culinary apparatus, a detachable rotor unit, detachably supported in the part of the head containing the rotating mechanism.

It is also an object of this invention to provide in connection with a culinary apparatus for mixing and beating purposes, means for supporting and operating a juice extractor, the means for supporting the juice extractor consisting of a rotating ring, having slots therein to engage projections of the juice extractor for supporting it on the culinary apparatus.

It is the further object of this invention to provide in connection with a culinary apparatus a tiltable head formed of separable sections, one offset over the other, but with the support for the head and a rotor shaft of the rotor in the same vertical plane, passing vertically through the longitudinal axis of the base, and to provide in connection with the separable sections a housing for the motor and motor shaft so that the motor shaft is connected directly to a gear on the rotor shaft so that there is a direct drive from the motor shaft to the rotor shaft.

These and other advantages will appear from the following description taken in connection with the drawings:

Figure 1 is a side elevation of the culinary apparatus showing the bowl and the heating means in section. Parts of the standard are broken away to show the bowl lug gripping parts. This figure also shows in dotted line the head tilted back.

Figure 2 is a perspective view of the upper end of the standard, showing the slots therein to receive a lug on the bowl.

Figure 3 is a horizontal section through the tiltable head, showing the motor and the manner of connecting the motor shaft to the rotor shaft.

Figure 4 is a section on line 4—4 of Figure 3.

Figure 5 is a section on line 5—5 of Figure 4.

Figure 6 is the front elevation of the apparatus with the head tilted back showing the lugs for supporting the juice extractor in section and in position for the supporting ring to be moved into extractor-supporting position.

Figure 7 is a vertical section through the juice extractor attached to the head.

Figure 8 is a view showing the disc for supporting the juice extractor in extractor supporting position and showing the lugs engaging the disc in section.

Figure 9 is a section on line 9—9 of Figure 3 showing the manner of connecting the two sections of the head together.

This apparatus is supported upon the base 1, which is rectangular in shape and has at each end legs 2 composed of rubber or some other suitable material so that the apparatus may be supported on a table or other object without marring its surface.

At one end of the base a seat 3 is provided for supporting a bowl.

Extending upwardly from the base is a lower portion 4 of a standard.

Associated with the seat 3 is a heater member 5, which has therein heating coils 6. This heater member may be detached from the base in case it is not desired to heat the contents of the bowl supported on the base. The current supplied for the heater may be the same as that supplied for the operation of the motor.

On the upper end of the standard is a lug 7 which has in the upper end thereof a slot 8. This slot is adapted to receive a lug or projection on the bowl supported on the base.

The head as a whole is indicated by the numeral 9 and has extending therefrom an upper section 10 of the standard. This section has on its lower end a pair of ears 11 which fit over and engage opposite sides of the lug 7, pivotally attached thereto by means of a bolt 12. The part of the projection 10 between the ears forms with the lug 7 and the slot 8, cooperating parts or surfaces 13 for engaging a projection or lug 14 on a bowl 15. This projection or lug is attached to one side of the bowl at the upper edge thereof so that when the bowl is properly placed in the seat, the lug may fit in the slot 8 and be gripped by the parts or surfaces 13 when the head is in horizontal position as shown in Figure 1.

When the parts are in the position shown in Figure 1, the lug is gripped so that the bowl is firmly held in its seat.

The head is divided into a motor section and a rotor section. The motor section has the motor 16 and the usual motor shaft 17. One end of this shaft is supported in a bearing 18 in one of the walls of the head.

Extending through the head, adjacent the bearing 18, is a plurality of holes 19; in each hole is a bushing 20. Within the bushing 20 is a sleeve 21 which is hollow and screw-threaded at one end and has a square opening at the other end.

In the screw-threaded end of the sleeve is a cap 22 which provides a seat for one end of a spring; in the other end of the sleeve is a square brush member 23, composed of carbon or some other suitable material.

Between one end of the brush member and the cap 22 is a spring 24 which tends to force the brush against the commutator ring 25 on the motor shaft.

To the motor section of the head is attached a rotor section 26 by means of screws 27, as shown in Figure 9. By having these sections thus detachable, the parts of the apparatus occupying the tiltable head are more easily assembled; the parts constituting the head are more easily machined and more cheaply manufactured, and provide a more accessible head for repair and replacement.

Cooperating with the bearing 18 is a second bearing 28, located in the rotor section of the head and supporting an intermediate part of the motor shaft. The end of the motor shaft remote from the motor is supported in the bushing 29. This bushing may be made of any suitable material such as a composition composed of bronze and graphite.

On the rotor shaft adjacent the motor is a fan 30, and adjacent each end of the motor are air holes for cooling the motor.

On the motor shaft between the bearing 28 and the bushing 29 is a worm 31. The bearing 28 and the bushing 29 and the part of the motor shaft supported thereby are located in the rotor section of the head. In this rotor section is a cavity 32 in which is located the rotor mechanism, operated by the worm 31 on the shaft 17. This rotor mechanism is assembled as a unit and may be as a unit placed in and removed from this cavity. This rotor unit is composed of the following parts:

A rotor shaft 33 which has suitably attached thereto near its center a worm gear 34, meshing with the worm 31 for rotating the rotor shaft from the motor shaft. On the lower end of the rotor shaft is a rotor 35, suitably attached thereto, in the present instance by means of a pin. The shaft with the gear and the rotor thereon is supported by means of a supporting plate 36, which has extending downwardly in the center thereof, a hub member 37; in this hub member is an opening or hole to receive the rotor shaft and in this hole is a bushing 38 surrounding the rotor shaft. On the upper end of the bushing is a flange 39 which engages the upper surface of the supporting plate.

Between this bushing 38 and the worm-gear 34 is a steel washer 40.

The upper end of the rotor shaft is supported in the bushing 41, suitably carried in the rotor section of the head. This bushing has a flange 42 adjacent the worm-gear 34, and between this flange and the worm-gear 34 is also a steel washer. The bushing 38 and the flange 39 and the bushing 41 and flange 42 are composed of some suitable composition such as bronze and graphite.

The upper surface of the rotor is cut out to form a cavity for the hub member 37. In the periphery of the rotor is a cut out cavity 43. The parts of the rotor adjacent the cavity 43 constitute supports for a gyrating shaft and for that purpose has aligned holes therein, and constitute an upper bearing 44 and a lower bearing 45.

In these bearings and around the gyrating shaft 47 are bushings 46. These bushings may be made of the same material that the other bushings are.

This gyrating shaft extends below the lower surface of the rotor section of the head and has extending therethrough a pin 48.

On the gyrating shaft, between the upper and lower bearings is a pinion 49 which meshes with an internally geared ring gear 50 supported in the lower part of the cavity 32.

The supporting plate 36 is circular in shape and is supported within the cavity 32 by means of screws 51. In order that these screws may be reached with some tool, a hole 52 is provided through the rotor.

The outer or lower end of the rotor shaft is provided with a slot 53 to receive a tongue on a juice extractor. This juice extractor is shown attached to the apparatus in Figure 7.

For the purpose of attaching the juice extractor to the rotor section of the head, there is provided an annular disc 54, supported on the head by means of screws 55, fitting into slots 56. In the present instance, there are four of these screws for supporting the disc.

For manipulating the disc, there is provided on one edge thereof a handle 57. This disc also has a plurality of key hole slots therein 58 for receiving and holding headed lugs on the juice extractor. The rotor head is also provided with circular holes therein 59 for the head of the holding lug.

When the juice extractor is placed in position with the heads of the lugs thereon projecting into the holes 59 and through the large parts of the key hole slots, the disc may be rotated so that the narrow parts of the key hole slots are brought in engagement with the head of the lugs on the extractor; by this means the extractor is held in position on the rotor section of the head.

The extractor is composed of a body member 60 which has extending therefrom a plurality of headed lugs 61 to engage the rotor head for supporting the juice extractor.

In the juice extractor is a shaft 62 which has a tongue 63 on one end thereof to fit in the slot 53 on the lower end of the rotor shaft. On the outer end of the shaft 62 is a reamer 63' such as is usually found in connection with juice extractors. Extending downwardly from the reamer is a spout 64 for catching and conveying away the juice extracted from the fruit.

When the juice extractor is used, the head is in a tilted position so that the rotor shaft is operating in a horizontal plane. At this time the gyrating shaft is idle, but when the juice extractor is removed, a stirrer, such as that shown in Figure 1, may be applied to the gyrating shaft. The stirrer is indicated by the numeral 65 and has a sleeve 66 extending upwardly therefrom to fit over the lower end of the gyrating shaft, and this sleeve has bayonet slots 67 therein to receive the pin in the lower end of the gyrating shaft so that the stirrer is supported in operating position on the gyrating shaft when the head is in horizontal position as shown in Figure 1.

When the present apparatus is used as a stirrer, the head is placed in a horizontal position as shown in Figure 1; when in this position the stirring implement is placed upon the gyrating shaft and caused to rotate and revolve in the bowl.

When it is desired to use the apparatus as a juice extractor, the head is turned to dotted position shown in Figure 1 and in full line position shown in Figure 6. When in this position, the juice extracting attachment as shown in Figure 7 is attached to the head by means of the lug members 61. The lugs on the juice extractor are inserted through the large parts of the key hole slots in this ring and in the aligned holes in the head beneath these key hole slots. After these lugs are fully inserted, the ring is rotated so that the heads are caught behind the ring and the juice extractor is supported.

The operation of the motor causes the rotation of the reamer and when any fruit is placed over the reamer, the juice is extracted therefrom by the rotation of the reamer, and the juice thus extracted passes down through the spout 64 and is caught in some vessel or container beneath the spout.

I desire to comprehend within my invention such modifications as may be clearly embraced within the claims and the scope of my invention.

Having thus fully described my invention, what I claim is new and desire to secure by Letters Patent is:

1. In a mixing apparatus, in combination with a bowl, a support for a stirrer consisting of pivoted members having thereon cooperating gripping parts, and means on the bowl gripped by said parts for holding the bowl.

2. In a mixing apparatus, in combination with a bowl, a support for a stirrer consisting of sections pivoted together and having abutting parts, one of said parts having a seat therein, and means on the bowl to fit in said seat and be gripped by the parts to hold the bowl.

3. In a mixing apparatus, in combination with a base having a standard extending upwardly therefrom, a lug on the upper end of said standard having a slot therein, a head having a pair of outwardly extending ears, pivoted to said lug, and a bowl having extending therefrom an arm adapted to fit within said slot and to be gripped therein for supporting a bowl.

4. In a culinary apparatus, in combination with a base having a seat therein, and a bowl adapted to rest in said seat, a projection on said bowl, and a standard on said base, said standard having a member pivoted thereto cooperating with the standard to grip said projection to hold the bowl in the seat.

5. In a culinary apparatus, in combination with a bowl having a lug thereon and a base having a seat for the bowl, a standard on the base, said standard having a slot therein to receive said lug, and a head pivoted to said standard and cooperating with the standard to grip the lug in the slot and hold the bowl in its seat.

In testimony whereof, I affix my signature.

NELSON EMMONS, 3rd.